April 28, 1953 — R. PRIES — 2,636,625
MASONRY BLOCK HANDLING DEVICE
Filed Sept. 14, 1948 — 2 SHEETS—SHEET 1

INVENTOR.
Rinehard Pries.
BY
Harness, Dickey & Pierce
ATTORNEYS.

April 28, 1953 R. PRIES 2,636,625
MASONRY BLOCK HANDLING DEVICE
Filed Sept. 14, 1948 2 SHEETS—SHEET 2
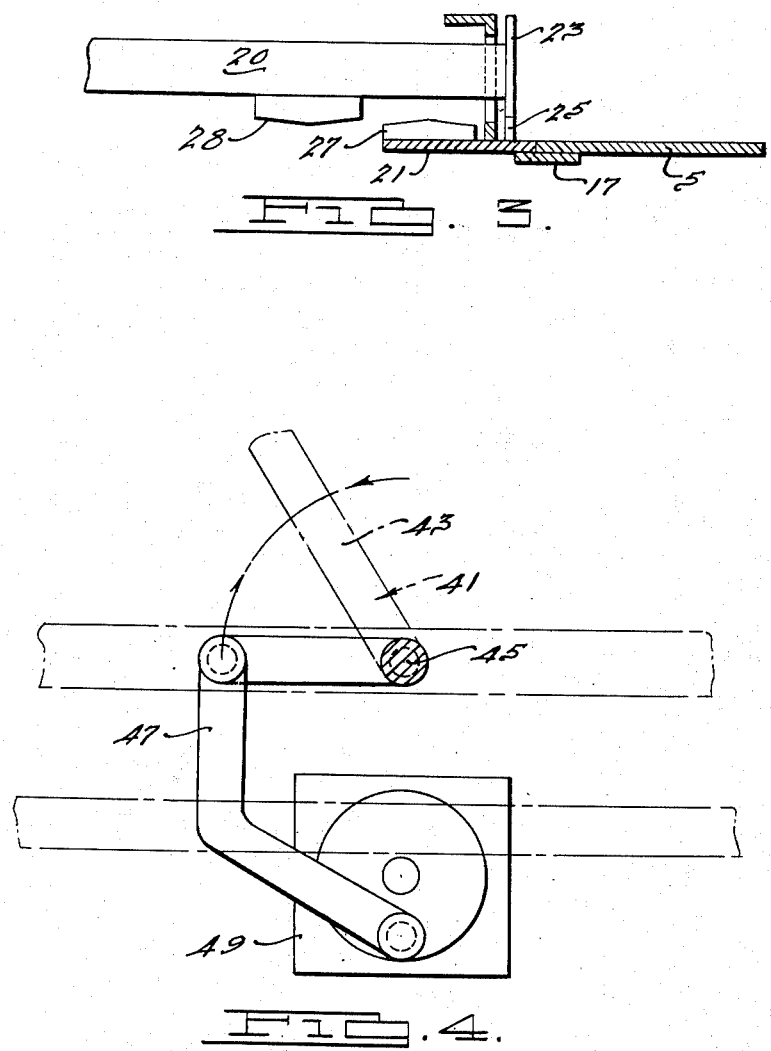
INVENTOR.
Rinehard Pries.
BY
Harness, Dickey & Pierce
ATTORNEYS.

Patented Apr. 28, 1953

2,636,625

UNITED STATES PATENT OFFICE 2,636,625

MASONRY BLOCK HANDLING DEVICE

Rinehard Pries, Fraser, Mich.

Application September 14, 1948, Serial No. 49,172

4 Claims. (Cl. 214—310)

This invention relates generally to material handling equipment and more particularly to equipment for handling palletized articles such as masonry blocks, or the like.

In the production of masonry articles such as cement blocks, the blocks are placed on pallet like members and cured in suitable kilns or the like. When the pallet like members with the cement blocks thereon emerge from the kiln, it has been necessary to manually unload the blocks from the pallets and then return the pallets to the block forming equipment for further use. Such an operation, of course, requires the use of several men and results in higher manufacturing costs and lower manufacturing efficiency.

It is an object of this invention to provide equipment for automatically handling palletized cement blocks after they are cured so as to eliminate the necessity of manually removing the blocks from the pallets, and manually returning the pallets to the block forming equipment.

It is a further object of this invention to provide in equipment of the aforementioned type a device for receiving the palletized cement blocks from the kiln and for automatically moving the cement blocks off of the pallets and onto suitable conveyor means or the like, and for automatically returning the unloaded pallets for re-use.

It is a further object of this invention to provide a device of the aforementioned type which is simple in construction, economical and efficient in operation and automatically responsive to the placement of the palletized blocks thereon to set in motion a continuous sequence of operations effecting separation of the blocks from the pallets and removal of the pallets for re-use.

It is a still further object of this invention to provide an improved arrangement for transferring palletized cement blocks or the like, from the cement block forming equipment to the aforementioned handling device.

Other objects of this invention will become apparent from the following detailed description, taken in conjunction with the accompanying drawing, in which:

Fig. 3 is a fragmentary longitudinal sectional view of a portion of the pallet receiver, the ram pusher device, and the ram raising device illustrated in Fig. 1; and Fig. 4 is a view partially in section and partially in elevation, looking toward the rear of the machine, showing the connection of the pallet transfer mechanism with its driving mechanism.

Figures 1, 2:
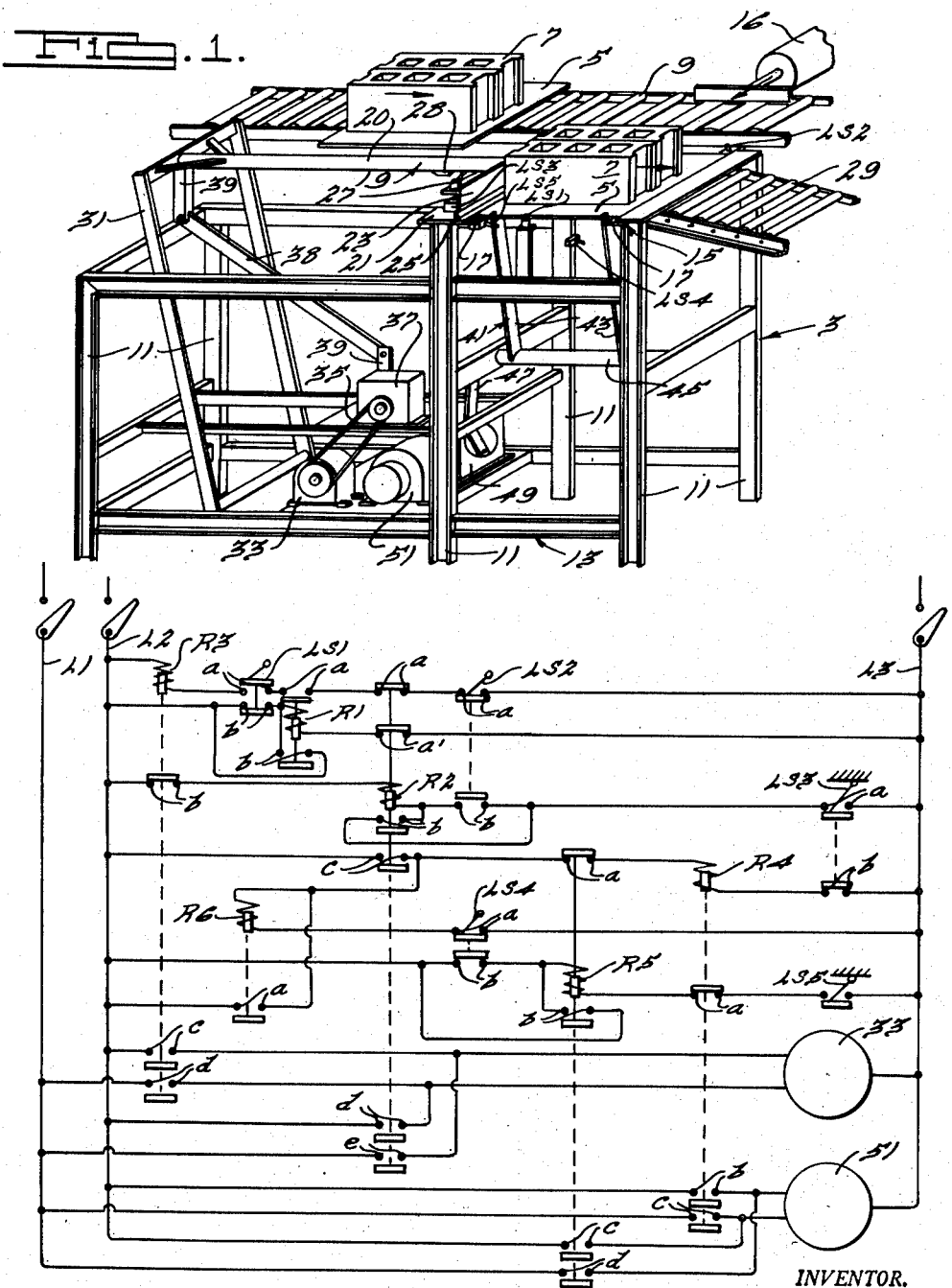
Figure 1 is a perspective view of the equipment of this invention.
Fig. 2 is a diagrammatical view of the electrical circuit for the device.

Referring now to the drawing, it will be seen that the equipment of this invention includes a device 3 which receives individual pallet members 5, carrying cement blocks or other suitable articles 7, from a suitable conveyor 9. The device 3 comprises a plurality of supporting legs 11 and frame work 13 which interconnects the legs so as to provide a rigid structure. Adjacent the one end of the device 3, a pallet supporting portion or receiver 15 is provided which is shown in the drawing as including a pair of opposed runners 17, which are adapted to slidably receive and support individual pallets 5. While the palletized blocks may be moved from the conveyor 9 to the receiver 15 in many ways, an air hoist or the like 16 is illustrated. The air hoist 16 is operated to move each block carrying pallet into the receiver 15 when it becomes aligned therewith on the conveyor 9.

A ram or pusher device 19 is provided, rearwardly of the receiver 15, for removing the blocks 7 from the pallet 5 in the receiver. The ram device 19 includes a horizontal rod or shaft 20 which carries, on the forward end thereof, a transversely extending head 23 having a hardened steel scraper 25 on the bottom thereof, for a use which will hereinafter appear. The scraper 25 normally rests on the upper surface of a platform 21, which is disposed immediately behind the receiver 15. The platform 21 is disposed above the runners 17, so that the upper surface of the platform is substantially flush with the top surface of the pallet in the receiver. It will thus be appreciated that the head 23 of the ram device 19 is adapted to move across the pallet 5, which is supported in the receiver 15, to remove the blocks 7 from the pallet. When the ram head 23 moves across the pallet the hardened steel scraper 25 will remove any excess material that may have been collected thereon. A stationary cam element 27 is provided, below the ram shaft 20, which is engageable by a cam 28 on the shaft to cause the ram head to raise a slight amount so that it will properly clear any irregular pallets. A suitable conveyor 29 is connected to the forward end of the device 3, adjacent the pallet receiver 15. The conveyor 29 is adapted to receive the cement blocks 7 which are removed from the pallet 5 by the ram device, in order to convey the blocks to any desired location.

The ram device 19 may be operated in any suitable manner and through any suitable mechanism, but in the embodiment illustrated herein the rear end of the ram shaft 20 is connected to the upper end of a rectangular rocker frame 31. The lower end of the frame 31 is pivotally connected to the framework 13 in any suitable manner. A three phase electrical motor 33 is supported on the framework 13, below the ram device 19, for operating the latter. The motor 33 is connected by a belt and pulley arrangement 35 to a gear reduction unit 37, which in turn is connected to the upper portion of the rocker frame 31 by means of a pitman 38 and arms 39. Therefore, when the motor 33 is driven in one direction the upper portion of the rocker frame 31 will be swung forwardly so as to move the ram head 23 across the top of the pallet supported in the receiver 15. This movement will cause the blocks 7 to be removed from the pallet and deposited on the conveyor 29. Upon reversal of the motor 33 the ram device returns to its initial position.

After the blocks 7 have been removed from the pallet 5, it is necessary to remove the unloaded pallet from the receiver 15 so that the next loaded pallet can be moved off of the conveyor 9 and into the receiver by means of the device 16. This is accomplished by means of a transfer mechanism 41 which includes a pair of generally vertically extending arms 43 whose upper ends engage one edge of the pallet 5 when the latter is inserted in the receiver 15. The lower ends of the arms 43 are connected to a cross shaft 45 which in turn is journalled in the framework 13 and has one end thereof connected to a pitman 47. The pitman 47 is operably connected through a gear reduction unit 49 to a second three phase electrical motor 51. Therefore, when the motor 51 is operated the transfer mechanism 41 will move the unloaded pallet out of the receiver 15, below the conveyor 9, and onto any suitable mechanism for return to adjacent cement block forming equipment.

When the loaded pallet 5 is positioned in the receiver 15 it will contact and close switch LS1, which completes an electrical circuit with the motor 33, in a manner which will be hereinafter described in detail, in connection with the electrical circuit illustrated in Fig. 2. The motor 33 will operate the ram device 19 in the aforementioned manner and when the ram reaches the end of its stroke it will engage switch LS2, which will reverse the motor 33 and cause the ram to return to its initial position. When the ram 19 returns to its initial position, it engages and holds open switch LS3. The motor 51 is then energized to cause the operation of the pellet removing transfer mechanism 41. The transfer mechanism arms 43, when in their initial position, hold open a switch LS5, and the latter closes when the arms 43 start their movement. When the transfer mechanism 41 reaches the end of its stroke it engages a switch LS4, which in turn reverses the motor 51 and causes the transfer mechanism to return to its initial position and open switch LS5, thus completing the operating cycle.

Referring now to Fig. 2, wherein the operating electrical circuit for the device is illustrated, it will be seen that the circuit is drawn for use with three-phase power. Upon closure of the line switches, lines L1, L2 and L3 are energized. Since, at this time there is no pallet in the receiver 15, the switch LS1 will be in the position shown with the contacts a thereof open and the contacts b thereof closed. The relay R1 will be energized immediately through a circuit from the line L2, the normally closed contacts b of switch LS1, the energizing winding of relay R1, the closed contacts a of a relay R2, and the closed contacts a of the switch LS2 to the line L3. The relay R1 will immediately be energized closing its contacts a and b. Contacts b establish a holding circuit for the relay R1 so that subsequent opening of the contacts b of switch LS1 is without effect. Closure of the contacts a of the relay R1 completes a preparatory circuit for a relay R3.

When the pallet 5 is placed in the receiver 15 it closes the contacts a of the switch LS1, thereby completing the circuit from line L2 through the relay R3, switch LS1, normally closed contacts a of relay R2, normally closed contacts a of the switch LS2 to the line L3 thereby energizing the relay R3 whereby the contacts c and d thereof are closed and the contacts b are opened. Closing of the contacts c and d energizes the motor 33 whereby the ram device 19 is actuated to remove the blocks 7 from the pallet 5. At the end of the stroke of the ram device 19, the switch LS2 is actuated, opening the contacts a thereof and closing the contacts b thereof. Opening of the contacts a de-energizes the relay R3 whereby the contacts c and d thereof are opened and the contacts b thereof are closed. Opening of the contacts c and d breaks the circuit to the motor 33 whereby the motor will stop. Closure of the contacts b prepares an energizing circuit for the relay R2 from the line L2 which is completed through the contacts b of the switch LS2 and the now closed contacts of the switch LS3 to the line L3 whereby the relay R2 is energized. The switch LS3 will be closed at this point since it is held open solely when the ram 19 is in its initial or retracted position.

Energization of the relay R2 opens the contacts a and a' thereof and closes the contacts b, c, d, and e thereof. Opening of the contacts a merely insures that a circuit cannot be made through the relay R3. Opening of the contacts a' de-energizes the relay R1 whereby its contacts a and b are opened. Opening of these contacts a prevents re-energization of the relay R3 upon reclosure of the contacts a of switch LS2. Opening of the contacts b of the relay R1 opens the holding circuit for the relay R1. Since the pallet 5 will maintain the switch LS1 in its actuated position with its contacts b open the relay R1 will not again be actuated. It may here be noted that for the relay R3 to be re-actuated the switch LS1 must be released by the removal of pallet 5 and again reclosed by the placement of another pallet in the receiver.

Closure of contacts b of relay R2 completes a holding circuit around the contacts b of the switch LS2 so that when the switch LS2 is opened upon retraction of the ram device 19 to its initial position the circuit through the relay R2 is not interrupted. Closure of the contacts c of the relay R2 closes a preparatory circuit from the line L2 to the energizing winding of the relay R4 through the normally closed contacts a of the relay R5. Closure of the contacts d and e of the relay R2 energizes the motor 33 for movement in the reverse direction to return the ram device 19 to its initial position, and also closes a circuit through the energizing winding of the relay R6 to the now closed contacts a of the switch LS4 to the line L3 whereby the contacts of the relay R6 are closed to establish a holding circuit maintaining the relay R6 energized even though the contacts *c* of the relay R2 are subsequently opened, and also to maintain the preparatory circuit initially made by the contacts *c* of the relay R2 energized. The subsequent closure of the contacts *a* of the switch LS2, due to the return movement of the ram device 19, is without effect to again energize the relay R3, since by this time the relay R1 has been de-energized, opening its contacts *a* and breaking the circuit to the relay R3 as above described.

At the completion of the return stroke of the ram device 19 contacts *a* of the switch LS3 are opened and contacts *b* closed to complete the circuit of the relay R4 to the line L3 whereby the relay R4 is energized, opening its contacts *a* and closing its contacts *b* and *c*. The opening of the switch LS3 de-energizes the relay R2, whereby the contacts *a* thereof will close and the contacts *b*, *c*, *d*, and *e* thereof will open. Opening of the contacts *d* and *e* de-energizes the ram motor 33. Opening of the contacts *b* de-energizes the holding circuit about the contacts *b* of the switch LS2. Opening of the contacts *c* of the relay R2 is without effect since it is now by-passed by the closed contacts of the relay R6.

Closing of the contacts *c* and *d* of the relay R4 energized the motor 51 to cause the transfer mechanism 41 to remove the pallet 5 from the receiver 15. With the arms 43 of the transfer mechanism 41 in their initial position the contacts *a* of the switch LS4 and the contacts *b* of the same switch will be open. At the end of the stroke of the arms 43 the switch LS4 will be actuated to open the contacts *a* and close the contacts *b* thereof. Opening of the contacts *a* de-energizes the relay R6, whereby its contacts will open de-energizing the relay R4, since prior to this time the relay R2 was de-energized due to opening of the switch LS3 by the ram device 19 as it reached its initial position. De-energization of the relay R4 will open contacts *b* and *c* thereof and close contacts *a* thereof. Opening of the contacts *b* and *c* of relay R4 de-energized the motor 51. Closure of the contacts *a* completed a preparatory circuit from the winding of the relay R5 through the contacts *a* of the relay R4 and the now closed switch LS5 to the line L3. It should be here remembered that upon movement of the arms 43 out of initial position the switch LS5 became closed. Closure of the contacts *b* of the switch LS4 completed the circuit from the line L2 to the energizing winding of the relay R5 whereby the relay R5 was energized opening its contacts *a* and closing its contacts *b*, *c* and *d*. Opening of the contacts *a* was without effect except to prevent energization of the relay R4 while the relay R5 is energized. Closure of the contacts *b* completed a holding circuit around the contacts *b* of the switch LS4 so that subsequent opening of the switch LS4 upon movement of the arms 43 toward initial position will not de-energize the relay R5. Closure of the contacts *c* and *d* of the relay R5 energizes the motor 51 for rotation in the opposite direction to return the arms 43 of the transfer mechanism 41 to their initial position. Upon movement of the arms 43 to their initial position the switch LS5 will be opened to de-energize the relay R5 whereby the contacts *a* thereof will be closed and the contacts *b*, *c* and *d* thereof will be opened. Closure of the contacts *a* is without effect except to prepare the circuit through the relay R4 for a subsequent energization. Opening of the contacts *b* de-energizes the holding circuit around the contacts *b* of the switch LS5. Opening of the contacts *c* and *d* de-energizes the motor 51, thus completing the cycle.

It will thus be appreciated that the equipment and device of this invention will automatically handle palletized articles in a simple, efficient and economical manner, and will eliminate the necessity for manual handling of the articles and of the pallets. This equipment will, therefore, result in lower manufacturing costs and higher manufacturing efficiency than has been heretofore possible in the art.

What is claimed is:

1. A device for handling palletized articles and the like, including a stationary supporting structure having a portion thereof adapted to receive and support a member having an article thereon, ram means supported on said structure adjacent said receiving portion for moving across said member so as to move the article off of the latter in one direction, lever means connected to said ram means for operating the latter, drive mechanism operatively connected to said lever means, means responsive to the placement of the member on the supporting portion to effect the operation of the drive mechanism so that the article is removed from the member by said ram means, lever means supported on said structure adjacent said receiving portion and adapted to engage a member on said supporting portion and move the member in a direction substantially at right angles to the direction of displacement of the article, drive mechanism for operating said lever means, and means responsive to the removal of the article from the member to effect the operation of said last drive mechanism so as to cause the removal of said member from said structure by said lever means.

2. A device for handling palletized articles and the like, including structure for receiving and supporting a substantially flat member having an article thereon, means including a ram adjacent said structure adapted to move the article off of the member, said means also including a scraper connected with said ram for scraping any foreign material from the article supporting surface of the member, actuating means connected to said ram for effecting the operation thereof, transfer mechanism adjacent said supporting structure adapted to engage the member supported on said supporting structure and remove the member from the structure after the article has been removed therefrom, drive mechanism for effecting the operation of said actuating means and transfer mechanism, means responsive to the placement of the member on the supporting structure to cause said drive mechanism to operate said rams and means actuatable by said article moving means to actuate said transfer mechanism and cause it to remove the member from said structure.

3. Equipment for handling palletized articles and the like, including conveyor means for moving a palletized article in one direction, stationary structure adjacent said conveyor means for receiving from said conveyor means and supporting a palletlike member having an article member thereon, transfer mechanism for moving said palletlike member with the article member thereon transversely of the direction of movement of the conveyor means and onto said receiving and supporting structure, transfer mechanism adjacent said receiving and supporting structure for moving the article member off of the palletlike member in a direction substantially parallel to the direction of movement of said conveyor means so as to unload the article member from the supporting structure, means actuatable by the movement of the palletlike member and article member onto the supporting structure for effecting the operation of the article transfer mechanism, additional transfer mechanism for moving the palletlike member relative to the supporting structure in a direction substantially at right angles to the direction of movement of said conveyor means so as to remove it from the supporting structure, and means actuatable by said article transfer mechanism for effecting the operation of said palletlike member transfer mechanism.

4. A device for handling palletized articles and the like, including a stationary framework structure for receiving and supporting a substantially flat member having an article thereon, ram means adjacent said structure adapted to move the article off said member and including a scraper for scraping any foreign material from the article supporting surface of the member, cooperating means on the ram means and supporting structure for causing the scraper to properly engage the supporting surface of the member, means for actuating said ram means, means responsive to the placement of the member on the supporting structure to cause the actuation of said ram, transfer mechanism adjacent said supporting structure for engaging the member supported thereon and moving the same in a direction at substantially right angles to the direction of movement of the article so as to remove the member from the supporting structure, mechanism for operating said transfer mechanism, and means responsive to the removal of the article from the member for effecting the operation of the transfer mechanism so as to cause it to remove the member from the supporting structure.

RINEHARD PRIES.

References Cited in the file of this patent

UNITED STATES PATENTS

| Number | Name | Date |
| --- | --- | --- |
| 1,556,438 | Hanson et al. | Oct. 6, 1925 |
| 1,889,846 | Wright | Dec. 6, 1932 |
| 1,901,928 | Olson | Mar. 21, 1933 |
| 1,907,458 | Stevenson | May 9, 1933 |
| 2,328,388 | Morgan et al. | Aug. 31, 1943 |
| 2,470,795 | Socke | May 24, 1949 |